United States Patent
Jeuch (10) Patent No.: US 7,000,426 B2
(45) Date of Patent: Feb. 21, 2006

(54) ADSORPTION REFRIGERATING DEVICE

(75) Inventor: Pierre Jeuch, Saint-Aubin (FR)

(73) Assignee: Thermagen (S.A.), Gif-sur-Yvette (FR)

( * ) Notice: Subject to any disclaimer, the term of this patent is extended or adjusted under 35 U.S.C. 154(b) by 105 days.

(21) Appl. No.: 10/239,822

(22) PCT Filed: Jul. 6, 2001

(86) PCT No.: PCT/EP01/09028

§ 371 (c)(1),
(2), (4) Date: Feb. 20, 2003

(87) PCT Pub. No.: WO02/02998

PCT Pub. Date: Jan. 10, 2002

(65) Prior Publication Data

US 2003/0159461 A1 Aug. 28, 2003

(30) Foreign Application Priority Data

Jul. 6, 2000 (FR) .................................. 00 08835
Nov. 13, 2000 (FR) .................................. 00 14559

(51) Int. Cl.
*F25B 17/08* (2006.01)
*F25B 17/00* (2006.01)
(52) U.S. Cl. .............................. 62/480; 62/481; 252/69
(58) Field of Classification Search ................. 62/480, 62/481, 477, 478, 101, 106; 165/104.12; 252/69; 502/400; 264/122

See application file for complete search history.

(56) References Cited

U.S. PATENT DOCUMENTS

| | | | |
|---|---|---|---|
| 3,579,464 A * | 5/1971 | Rosen et al. ................. 423/338 |
| 4,144,171 A * | 3/1979 | Krause ........................ 210/496 |
| 4,220,553 A * | 9/1980 | Krause ........................ 502/402 |
| 4,367,079 A | 1/1983 | Wallsten |
| 4,581,049 A | 4/1986 | Januschkowetz |
| 4,637,218 A | 1/1987 | Tchernev |
| 4,674,563 A | 6/1987 | Maier-Laxhuber et al. |
| 4,759,191 A | 7/1988 | Thomas et al. |
| 4,928,495 A | 5/1990 | Siegel |
| 5,335,519 A | 8/1994 | Bernier |
| 5,482,906 A * | 1/1996 | Sakai et al. ................. 502/402 |
| 5,661,986 A | 9/1997 | Labranque |
| 5,768,908 A * | 6/1998 | Tanaka et al. ................. 62/480 |
| 2004/0035145 A1 * | 2/2004 | Jeuch .......................... 62/480 |

FOREIGN PATENT DOCUMENTS

| | | |
|---|---|---|
| DE | 94 04 126.1 U1 | 8/1994 |
| DE | 197 30 697 A1 | 1/1999 |
| DE | 198 18 807 A1 | 10/1999 |
| FR | 948 292 A | 7/1949 |
| FR | 1 029 877 A | 6/1953 |
| FR | 2 679 633 A1 | 1/1993 |
| WO | WO 99/49964 A1 | 10/1999 |
| WO | WO 00/31206 A1 | 6/2000 |

* cited by examiner

*Primary Examiner*—Chen Wen Jiang
(74) *Attorney, Agent, or Firm*—Sughrue Mion, PLLC (57) ABSTRACT

An adsorption refrigeration device comprising an evaporator chamber containing a refrigerant liquid that evaporates under the effect of a depression, a connecting device and an adsorption chamber containing an adsorbent capable of fixing the vapors of the refrigerant liquid, wherein the adsorbent is constituted by one or more rigid blocks comprising a plurality of cavities, at least one part of said cavities being feeder cavities capable of diffusing vapors of refrigerant liquid on the adsorbent.

36 Claims, 6 Drawing Sheets

Fig. 3b
View A

Fig. 4a

Fig. 4b
View A'

View B

ADSORPTION REFRIGERATING DEVICE

BACKGROUND OF THE INVENTION

1. Field of the Invention

The present invention relates to a device for refrigeration by evaporation and adsorption, whose principle consists in evaporating a liquid under the effect of a depression sustained by adsorption of the vapors of said liquid. It is the evaporation of this refrigerant liquid contained in an evaporator (a chamber, cavity or the like) that prompts a cooling in the vicinity of the evaporator. Another chamber, containing adsorbent material, is generally connected to the evaporator.

2. Description of the Prior Art

The principle of refrigeration by evaporation of a refrigerant liquid and adsorption of vapor of this liquid has undergone numerous developments, both for cyclical systems (with regeneration of adsorbents by heating) and for single-use systems.

In all these devices, the adsorption is accompanied by heat dissipation in the adsorbent leading to a rise in temperature which it is sought to limit by discharging a part of this heat.

The cyclical devices generally comprise adsorbents in connexion with heat exchangers which firstly discharge the heat dissipated by the adsorbents during the adsorption reaction of the refrigerant liquid vapors and secondly heat these adsorbents to regenerate them.

The principle of cyclical adsorption for refrigeration is described in the U.S. Pat. No. 4,637,218.

In the cyclical systems, a refrigerant liquid is evaporated by adsorption and then condensed, the adsorbents being regenerated by heating after having fulfilled their adsorption function. Heat exchangers are designed firstly to cool the adsorbents during their function of adsorption and secondly to heat these adsorbents for their regeneration.

One of the main difficulties of the cyclical devices lies in the efficiency of the heat coupling between the heat exchangers and the adsorbents. For example, efficient thermal coupling is difficult to achieve with zeolites which are very efficient adsorbents otherwise. Indeed, the adsorbents usually take the form of grains or rods having very poor heat conductivity. The result thereof is low efficiency of cyclical systems.

The U.S. Pat. No. 5,535,817 has efficiently analyzed these difficulties and proposes a method for forming zeolites by deposition on a metal surface giving greatly enhanced performance. The zeolites are directly deposited on the interior surface of metal tubes so as to form an internal lining. The method of deposition proposed in this patent is however complicated to implement. This makes it difficult to apply in the case of low-cost, large-scale production.

In the case of single-use devices, the U.S. Pat. No. 4,759,191 proposes to limit the rise in temperature by the addition to the adsorbents of different materials, especially materials having a solid-liquid phase change between 30° C. and 70° C. To obtain a significant effect, it is necessary however to have a large quantity of solid-liquid phase-changing materials (typically twice as much as the adsorbents to get a significant effect). This U.S. Pat. No. 4,759, 191 also mentions the possibility of using a liquid-gas phase-changing material as well as adsorbent temperatures of up to 100° C. or even 110° C. However, the constraints related to the implementation of such a device are not analyzed.

SUMMARY OF THE INVENTION

The aim of the present invention is to overcome the drawbacks of the prior art.

To this end, the present invention proposes a shaping of the adsorbents that is particularly well suited to the discharging of the heat released during adsorption and is economically advantageous to implement.

According to the invention, the adsorbents are prepared in the form of rigid blocks having cavities. At least a part of these cavities is used to enhance the distribution of the vapors of the refrigerant liquid for efficient adsorption and another part can be used to discharge the heat released during the adsorption. In the case of applications to cyclical devices, the cavities dedicated to the discharging of the heat by which it is also possible to heat the adsorbents for their regeneration.

The invention relates more particularly to an adsorption refrigeration device comprising an evaporator chamber containing a refrigerant liquid with its vapors that evaporates under the effect of a depression, a connecting device and an adsorption chamber under vaccum containing an adsorbent capable of fixing the vapors of the refrigerant liquid, wherein the adsorbent is constituted by one or more rigid blocks comprising a plurality of cavities, at least one part of said cavities being feeder cavities capable of diffusing vapors of refrigerant liquid on the adsorbent.

According to one characteristic, at least one other cavity is a heat-exchange cavity capable of discharging the heat released during the adsorption of the vapors of the refrigerant liquid.

According to one particular feature of the invention, the block has two zones separated by a thermally conductive vacuum-tight sheathing, the first zone comprising the adsorbent and the feeder cavities and opening on one face of the block in the adsorption chamber, and the second zone comprising the at least one heat-exchange cavity and opening on the opposite face of the block on the outside of the adsorption chamber.

According to one embodiment, the sheathing comprises at least one metal tube that sheath the at least one heat exchange cavity.

According to another embodiment, the first zone of the block contains metallic ribs thermally bonded to the sheathing, advantageously in aluminum.

According to another embodiment, the sheathing consists of a plastic film resting on the walls of the second zone of the block and bonded to the adsorption chamber.

According to one characteristic, the adsorbent is a zeolite.

Depending on the modes of implementation, the refrigerant liquid is water and/or an alcohol.

According to one characteristic, the block furthermore has a thermal insulation on its periphery advantageously constituted by a mixture of adsorbent and resin.

According to a first application, the device according to the invention is a single-use device.

According to one characteristic, the at least one heat-exchange cavity contains a heat sink constituted by a phase-changing material.

According to a first embodiment, the phase-changing material passes from the solid state to the liquid state.

According to a second embodiment, the phase-changing material passes from the liquid state to the gas state.

According to one characteristic, the second zone of the adsorbent block comprises a vapor diffusion device, advantageously, the vapor diffusion device consists of a hydrophobic porous material.

According to another characteristic, the second zone of the block comprises a lid with at least one aperture to the outside atmosphere constituted by at least one hole that limits the flow rate of the vapor of the phase changing material.

According to a characteristic, the vapor of the phase changing material undergoes adiabatic expansion through said at least one hole so as to lower the temperature when it escapes outwards, advantageously, the lowering of the temperature of the vapor is greater than or equal to 35° C.

According to one implementation, the phase-changing material comprises an aromatic additive releasing a sense of freshness.

According to a second application, the device according to the invention is a cyclical-use device comprising an adsorption phase and an adsorbent regeneration phase, the at least one heat-exchange cavity being furthermore capable of heating the adsorbents for their regeneration.

According to one characteristic, the at least one heat-exchange cavity contains a heat-carrying fluid consisting of a liquid-gas phase-changing material.

According to another characteristic, the at least one heat-exchange cavity is closed by a dome whose external surface is in contact with a fluid flowing in a thermal circuit.

According to another characteristic, the at least one heat-exchange cavity comprises at least one tube for the supply of heat-carrying fluid.

According to one feature, the boiling temperature of the heat-carrying fluid is different in the two distinct phases of adsorption and regeneration.

According to one characteristic, the boiling temperature of the heat-carrying fluid is regulated by the pressure of the fluid flowing in the thermal circuit in contact with the domes.

BRIEF DESCRIPTION OF THE DRAWINGS

The particular features and advantages of the invention shall appear clearly from the following description, given by way of an non-restricted illustration, and made with reference to the appended drawings, of which:

FIG. 3b is a diagrammatic view in longitudinal section of a portion A of the device according to the invention shown in FIG. 3a;

FIG. 4b is a diagrammatic view in longitudinal section of a portion A' of the device according to the invention shown in FIG. 4a;

FIG. 5b is a diagrammatic longitudinal section view of a portion B of the device according to the invention shown in FIG. 5a.

MORE DETAILED DESCRIPTION

The invention proposes to obtain a particular shaping of the adsorbents that gives firstly efficient adsorption and secondly easy discharge of the heat released by the adsorption reaction and fast regeneration of said adsorbents if necessary.

Referring to FIGS. 1a–b and 2a–b, the device according to the invention presents the general shape of a block 200 consisting of adsorbents 205 shaped and placed in an adsorption chamber 300 comprising a heat insulation 350 on its periphery. In those figures, the block 200 is circular but other shapes can be envisaged, especially a rectangular shape.

According to an essential characteristic of the invention, the block 200 of adsorbents 205 has a plurality of cavities 210, 220 obtained during the shaping of said adsorbents 205 in a block 200. The sections of these cavities 210, 220 may be identical or may vary depending on the desired application.

The device according to the invention comprises at least one evaporator chamber containing a refrigerant liquid L capable of evaporating under the effect of a depression. After opening of the connecting device, the vapors V of this liquid L are adsorbed in the adsorption chamber by the adsorbent 205 shaped according to the invention. This association shall be described more fully hereinafter with reference to FIGS. 3a and 4a.

The refrigerant liquid L is preferably water but it may also be alcohol (methanol, ethanol).

The adsorbent 205 is preferably a zeolite. For example, a zeolite 13X or zeolite 4A made of fine powder (with a grain size of some microns to some tens of microns) mixed with a binder (a clay, for example kaolin or other additives known by those skilled in the art), and water to give a thick paste that can be shaped in a block 200 provided with cavities 210, 220.

The heat insulation 350 on the periphery of the block 200 is advantageously provided by zeolites impregnated with resin in order to obstruct their porosity to prevent them from adsorbing water vapor. This heat insulation 350 furthermore contributes to the rigidity and robustness of the block 200 which is then vacuum-assembled in the adsorption chamber 300, made of aluminum or steel for example.

At least one part of the cavities consists of feeder cavities 210 used for the diffusion of the vapors V of the refrigerant liquid L. According to one embodiment (FIG. 1a), all the cavities 210 may be assigned to this function of diffusion of the vapors V of the refrigerant liquid L without any need for a discharge of heat. It can then be expected that the efficiency of the adsorbent 205 per unit of mass, as the temperature rises, will be limited. For certain devices in which a large quantity of adsorbent can be used, this configuration can be favored for its simplicity to manufacture.

According to another embodiment (FIG. 1b), only one part of the cavities are feeder cavities 210, the other part being heat-exchange cavities 220 designed to discharge the heat released by the reaction of adsorption and possibly the regeneration of the adsorbents in the case of a cyclical device. Advantageously, one in every two cavities is assigned to this function.

Figure 3A:
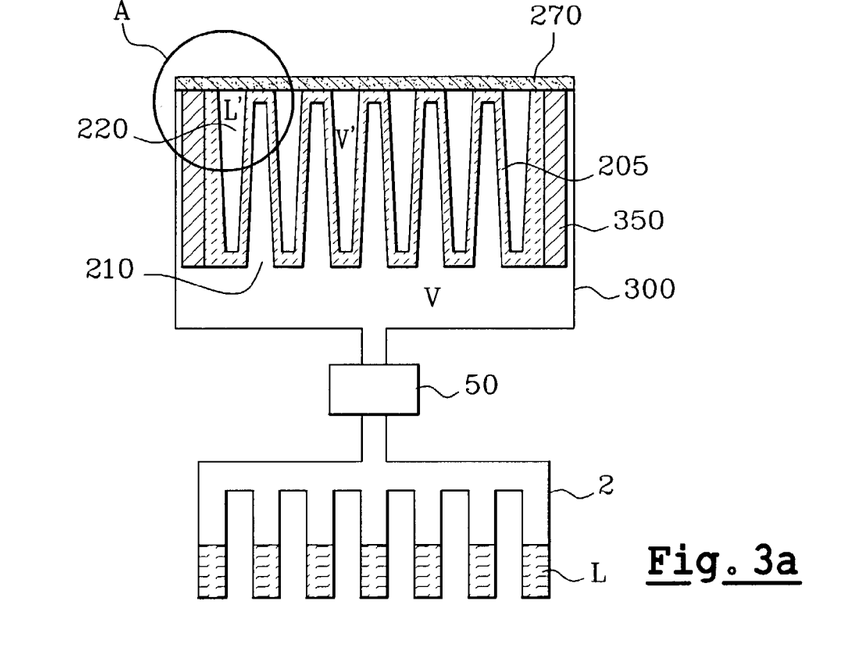
FIG. 3a is a diagram of the device according to the invention in a first single-use application.
Figure 3B:
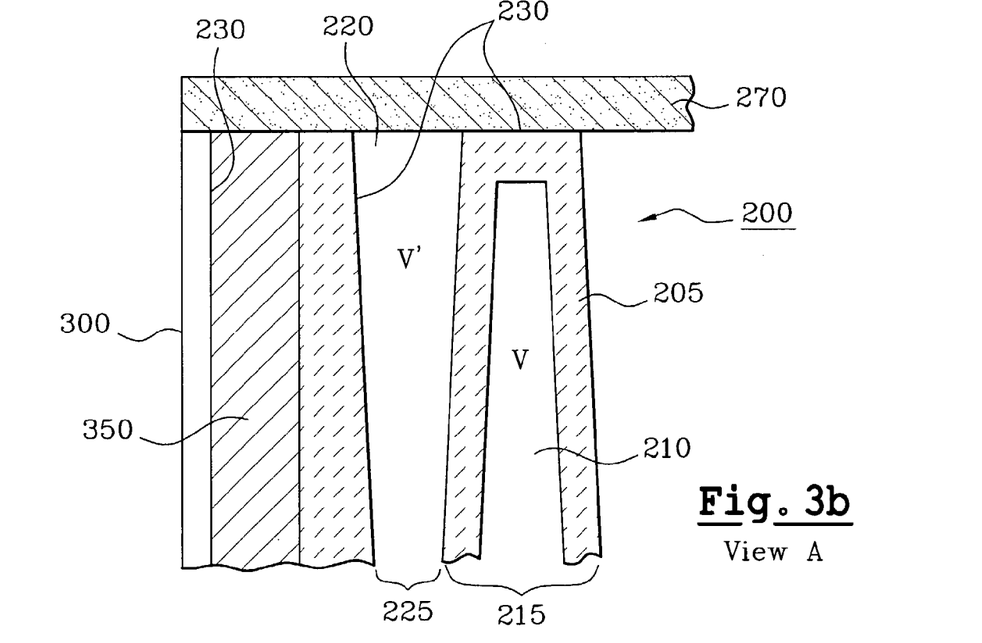

The adsorbent block 200 essentially has two zones separated by a sheathing 230, that is vacuum-tight but nevertheless has efficient heat exchange (FIG. 3b). A first zone 215 under vacuum contains the adsorbent 205, zeolites for example, and feeder cavities 210, and is open on one face of the block 200 in the adsorption chamber 300. A second zone 225 under pressure contains the at least one heat-exchange cavity 220, and is open one the opposite face of the block on the outside of the adsorption chamber.

Advantageously, the sheathing 230 is directly deposited on the walls of the second zone 225 and bonded to the adsorption chamber 300. Depending on the embodiments, this sheathing 230 may consist of vacuum-tight tubes made of metal for example that sheath the heat-exchange cavities 220 or a film constituting a sealed lining such as kapton or polyimide film for example.

Figure 1A:
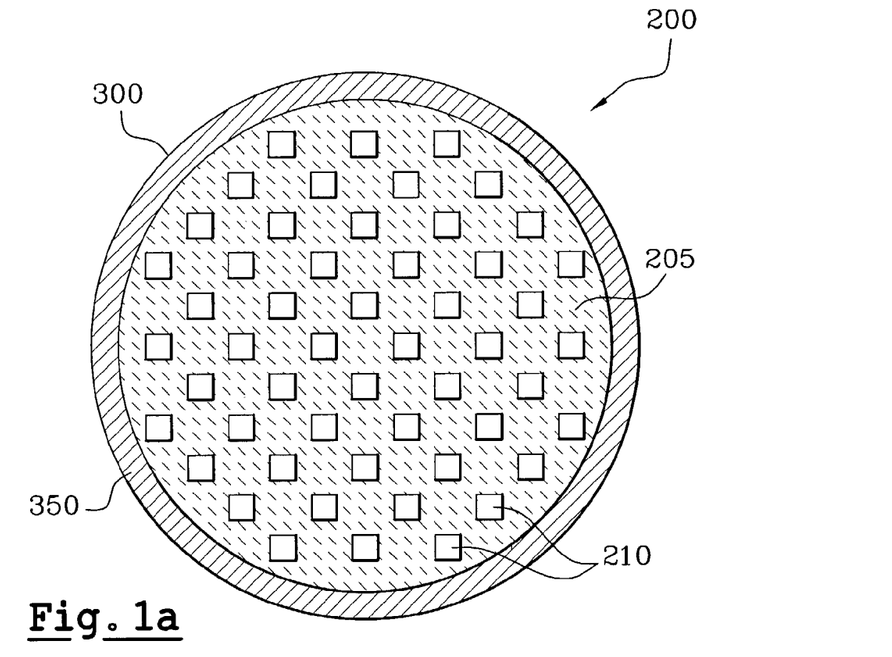
FIGS. 1a and 1b are schematic cross-sectional views of a portion of an adsorbent block of the device according to a first and second embodiment of the invention.
Figure 1B:
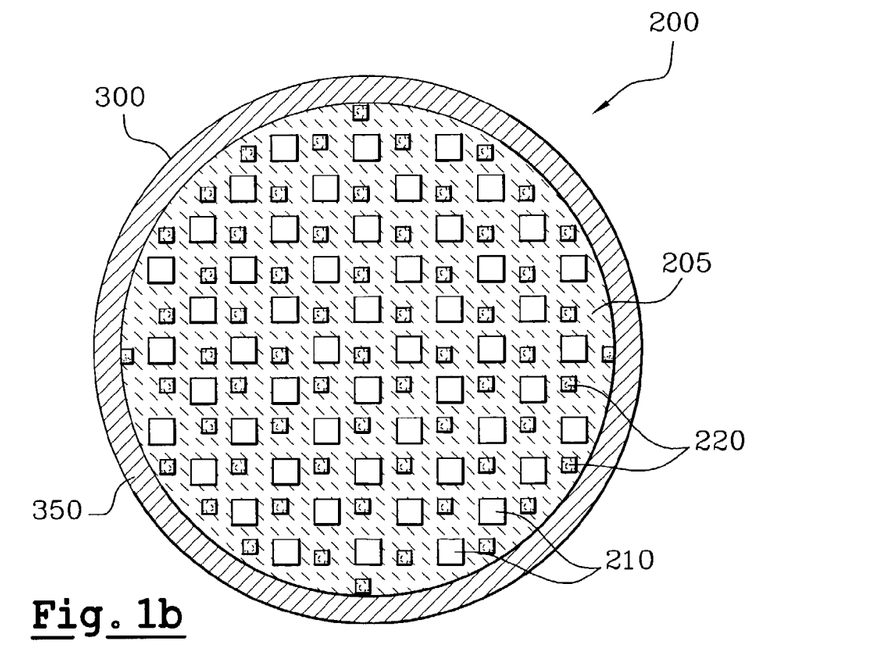
Figure 2A:
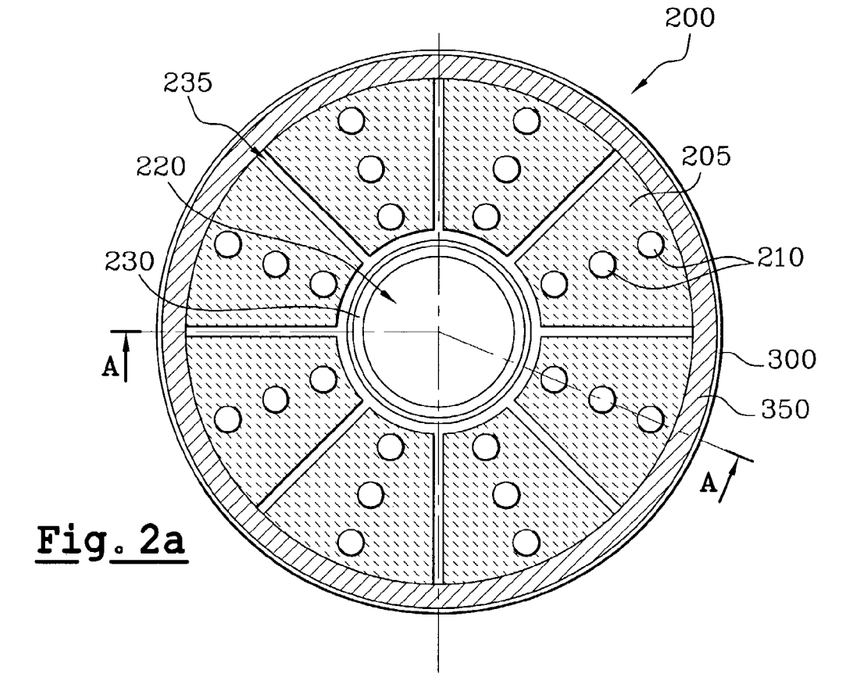
FIGS. 2a and 2b are respectively a schematic cross-sectional view and longitudinal view along AA of a portion of an adsorbent block of the device according to a third embodiment of the invention.
Figure 2B:
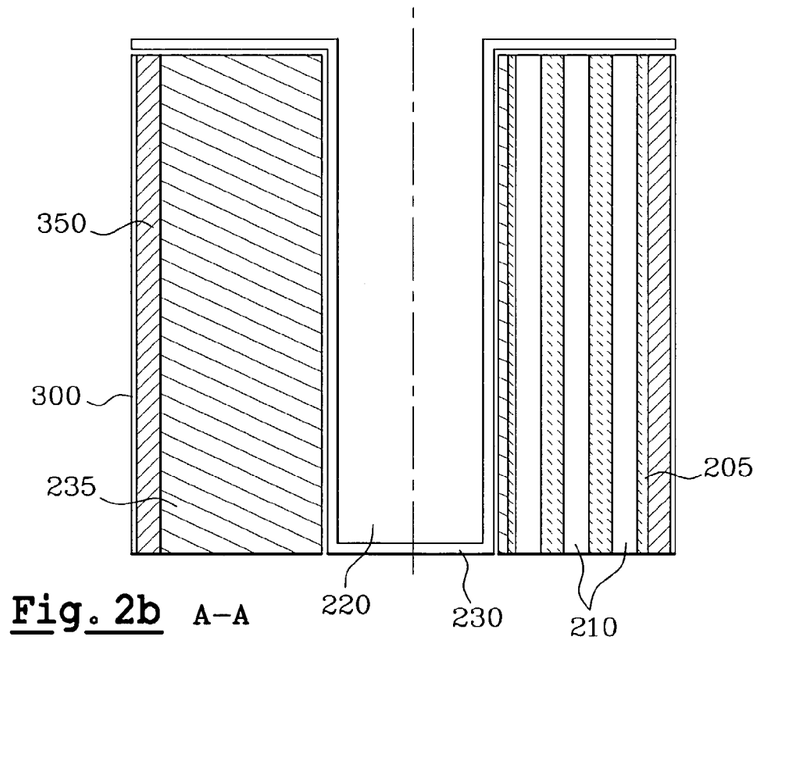

According to another embodiment (FIGS. 2a and b), the first zone of the block 200 contains metallic ribs 235 thermally bonded to the sheathing 230 in order to enhance the heat exchange between the heat exchange cavity 220 and the adsorbent block 205. In this way, it is possible to make only one heat exchange cavity 220 with one tube 230 having ribs 235 that carry on through the whole adsorbent block 205. Advantageously, the ribs 235 are made of aluminum, as might be the tube 230 of the sheathing.

The first feeder zone 215 is connected to the evaporator chamber, and its function is to achieve the vacuum adsorption of the vapors V of the refrigerant liquid L. The second heat exchange zone 225 may be open to the exterior for a discharge of the heat, or it may be sealed or closed on a cooling circuit. These different arrangements are described more fully with reference to the applications of the device according to the invention.

An application of the device according to the invention shall be described with reference to FIGS. 3a–b and 4a–b in the context of a single use.

As seen on FIG. 3a, the adsorption chamber 300 is connected to an evaporator chamber 2 consisting of an airtight cavity containing a refrigerant liquid L. A connecting device 50, consisting of a delidding means or a valve for example, is used to activate and then maintain the flow of the vapors V of the refrigerating liquid L. This connecting device 50 is connected to the first zone 215 of the block 200, namely the feeder cavities 210 which diffuse the vapor V on the adsorbents 205.

The detail of FIG. 3b enables a clear view of the sheathing 230 between the two zones 215 and 225 of the block 200.

In the application of the device according to the invention for single use, the heat-exchange cavity 220 contains a heat sink consisting of a phase-changing material (solid-liquid or liquid-gas depending on the embodiment).

The phase-changing material may be sodium acetate which goes from the solid phase to the liquid phase. The second zone 225 (heat exchange zone) must then be sealed to prevent a flow of liquid. An entirely closed block 200 may have advantages but the quantity of phase-changing material is great because of the latent heat of sodium acetate. This is a drawback for low-cost devices.

The phase-changing material may also be water which passes from the liquid phase to the gas phase V'. The most efficient way to limit the rise in the temperature of the adsorbent is to remove the calories by water evaporation, for the latent heat of water is very high (45 KJ per mole, namely 18 g of water).

According to a first embodiment, shown on FIGS. 3a–b, a diffusing device 270 of the hot vapors V' of the phase changing material may be planned in the second zone 225 on the face of the block 200 opposite the entrance of the vapors V of the cooling liquid L. This diffusing device 270 may consist of a hydrophobic porous layer that lets through hot vapors V' but no liquid of the phase-changing material. Thus, despite an opening on the exterior, the diffusing device 270 provides for mechanical protection of the adsorbent block 200 and sealing of the phase changing materiel.

In that way, the second zone 225 is opened on to the exterior to let the vapor V' escape and remove the heat released by the adsorption reaction. However, for fast evaporation, the water should be brought to boiling point. This entails a potential risk of burn injuries. To avert this risk, the present invention proposes to associate means with the adsorbent to bring down the temperature of the released vapor.

Figure 4A:
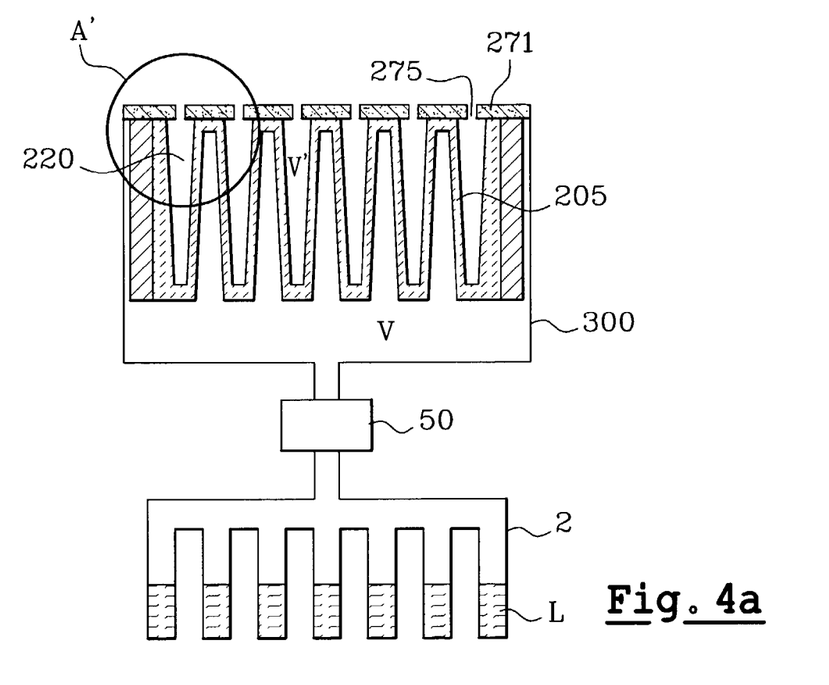
FIG. 4a is a diagram of the device according to the invention in a second single-use application.
Figure 4B:
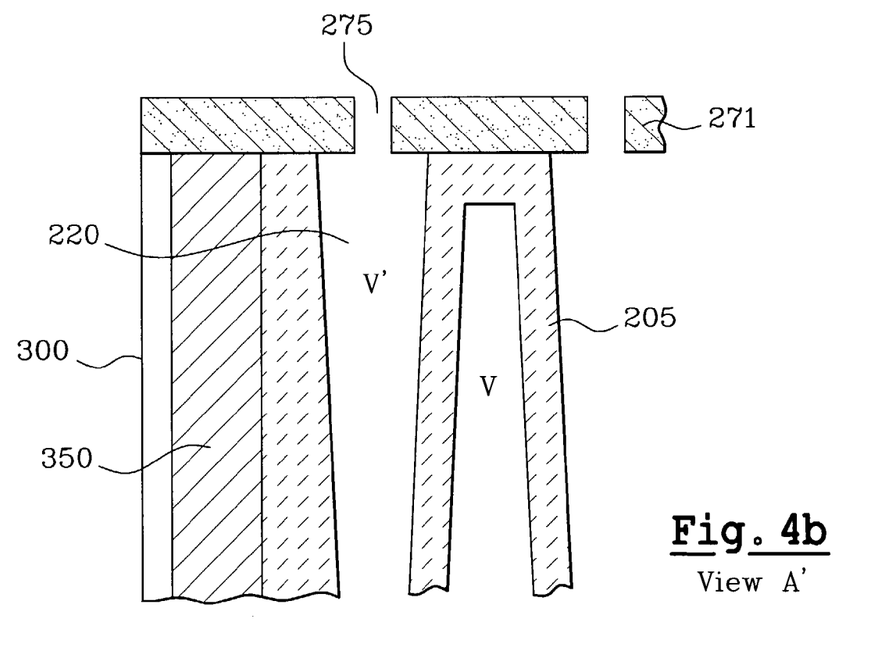

According to a second embodiment, shown on FIGS. 4a–b, the at least one heat-exchange cavity 220 contains a cooling liquid (preferably liquid water) and is placed in thermal contact with the adsorbent. This heat-exchange cavity 220 has at least one aperture 275 to the outside atmosphere constituted by one or more small holes that limit the flow rate of the water vapor V' that might escape.

According to one mode of implementation, it is possible to provide for an additive to the liquid-vapor phase-changing material that adds an artificial aroma to the hot vapors V' released to the exterior of the block 200. This artificial aroma, based on eucalyptus or watermelon for example, advantageously produces a sense of freshness.

As shown with more details on FIG. 4b, the heat-exchange cavity 220 has at least one aperture 275 into the outer atmosphere constituted by one or more small holes that limit the flow rate of the vapor V' that can escape. This hole or these holes 275 furthermore prompt an adiabatic expansion of the vapor V' under pressure so as to lower the temperature when it escapes outwards.

According to one possible embodiment, the assembly constituted by the adsorbent 205 and the at least one heat-exchange cavity 220 is closed by a lid 271 (made of metal such as aluminum for example). This lid 271 may have one or more holes 275 whose diameter is limited in order to provide for an adiabatic expansion of the vapor V' of the cooling liquid (the phase changing material).

During the operation of the device, the heat released by the adsorbent 205 prompts the evaporation of the cooling liquid and an increase in the pressure of vapor V' inside the heat-exchange cavity 220. When the pressurized vapor V' escapes through the small-diameter hole or holes 275, it undergoes adiabatic expansion or pressure reduction which lowers its temperature. The extent of the drop in temperature of the vapor V' escaping outwards is all the greater as the flow rate of vapor V' is high. This is because, in this case, the pressure in the exchanger 220 is high and the expansion is great.

The numerical table here below illustrates the lowering of the temperature of the vapor V' discharged into the outside atmosphere during the working of the device.

| Temperature in the exchanger (° C.) $T_1$ | Pressure $P_1$ in the exchanger (bar) | Temperature after expansion (° C.) $T_2$ |
| --- | --- | --- |
| 100 | 1 | 100 |
| 105 | 1.2 | 87 |
| 110 | 1.4 | 78 |
| 115 | 1.7 | 65 |
| 120 | 2 | 55 |
| 125 | 2.3 | 48 |

Thus, for example, for an overpressure of one bar, the temperature of the vapor V' in the exchanger 220 rises to 120° C. but, after pressure reduction through the hole or holes 275, the temperature of the discharged vapor is no more than about 55° C. This overpressure may be achieved, for example, by a flow rate of vapor V' of 0.1 g/sec through a hole with a section of 0.4 mm².

The cooling by adiabatic expansion or pressure reduction is governed by the following physical law:

$$\frac{T_2}{T_1} = \left(\frac{P_2}{P_1}\right)^{\frac{\gamma-1}{\gamma}}$$

where the pairs $(T_1, P_1)$ and $(T_2, P_2)$ are the temperatures and pressures before and after pressure reduction.

And where $\gamma$ is the isentropic constant, $\gamma = 1.35$ for H2O at 100° C., $(\gamma-1)/\gamma = 0.259$ The following table illustrates the cooling capacity obtained as a function of the overpressure caused. The vapor pressure as a function of the temperature is taken from the Handbook of Chemistry and Physics, 80th edition. The flow rates of the table correspond to a hole with a diameter of 1 mm (0.8 mm 2) (Flowmaster code). The flow rate of vapor V' is proportional to the surface area of the hole, and the cooling capacity is proportional to the flow rate (latent heat of vaporization of water).

| T (° C.) | P (bar) | Flow rate g/sec | P (Watt) |
|---|---|---|---|
| 200 | 15.53 | 1.62 | 4005 |
| 190 | 12.54 | 1.33 | 3325 |
| 180 | 10 | 1.05 | 2625 |
| 170 | 7.91 | 0.81 | 2025 |
| 160 | 6.17 | 0.63 | 1575 |
| 150 | 4.75 | 0.48 | 1200 |
| 140 | 3.61 | 0.36 | 900 |
| 130 | 2.70 | 0.27 | 675 |
| 120 | 1.98 | 0.20 | 500 |
| 115 | 1.69 | 0.17 | 425 |
| 112 | 1.53 | 0.15 | 375 |
| 110 | 1.43 | 0.134 | 335 |
| 108 | 1.33 | 0.12 | 300 |
| 106 | 1.24 | 0.10 | 250 |
| 104 | 1.16 | 0.082 | 205 |
| 102 | 1.08 | 0.060 | 150 |
| 100 | 1 | | |

Figure 5A:
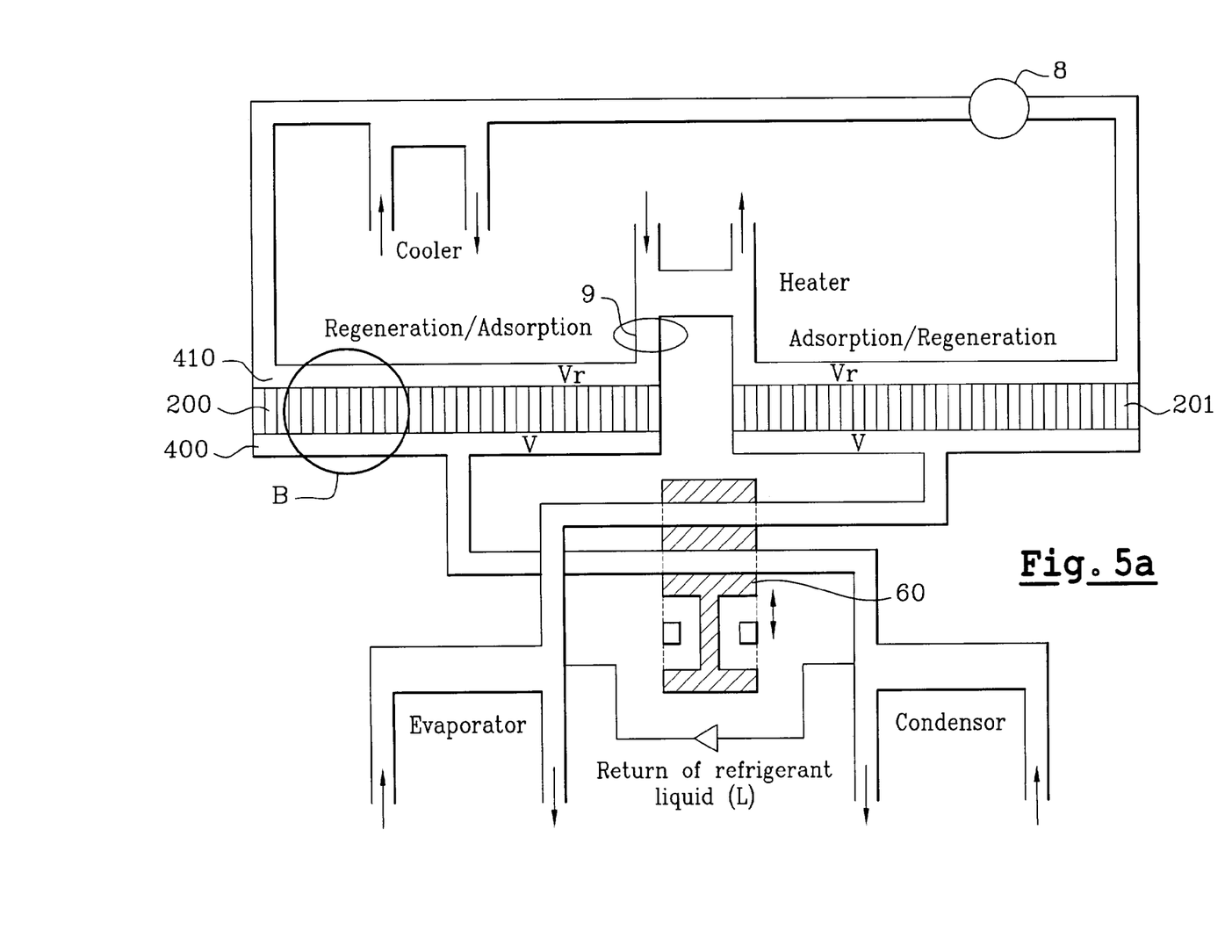
FIG. 5a is a drawing of the device according to the invention in a cyclical-use application.

An application of the device according to the invention shall now be described with reference to FIGS. 5a and 5b in the context of cyclical use.

A device of this kind has two sets of adsorbents 200 and 201 that successively and alternately work in adsorption and regeneration phases.

A primary adsorption circuit 400 connects the adsorbent blocks 200, 201 to an evaporator 2 and a condenser 4, a two-position valve 60 being used for the alternate connection of each block 200, 201 to either of these devices. The vapor V of the refrigerant liquid L flows in this primary circuit 400.

A secondary regenerating circuit 410 connects the adsorbent blocks 200, 201 to a heater 5 and to a cooler 6. A reversible pump 8 makes a secondary fluid Vr flow into this circuit 410. The pump 8 raises the pressure of the secondary fluid Vr in the circuit portion 410 adjacent to the block 200 in regeneration and a pressure reducer 9 located between the two blocks 200, 201 reduces the pressure of this fluid Vr in the circuit portion 410 adjacent to the block 201 in adsorption.

The external exchange circuits are in accordance with the prior art:
the cold is produced in the evaporator 2,
the condenser 4 and the cooler 6, which may be series-mounted in this order, recover the extracted calories,
the heater 5 provides additional energy for the operation of the device.

Figure 5B:
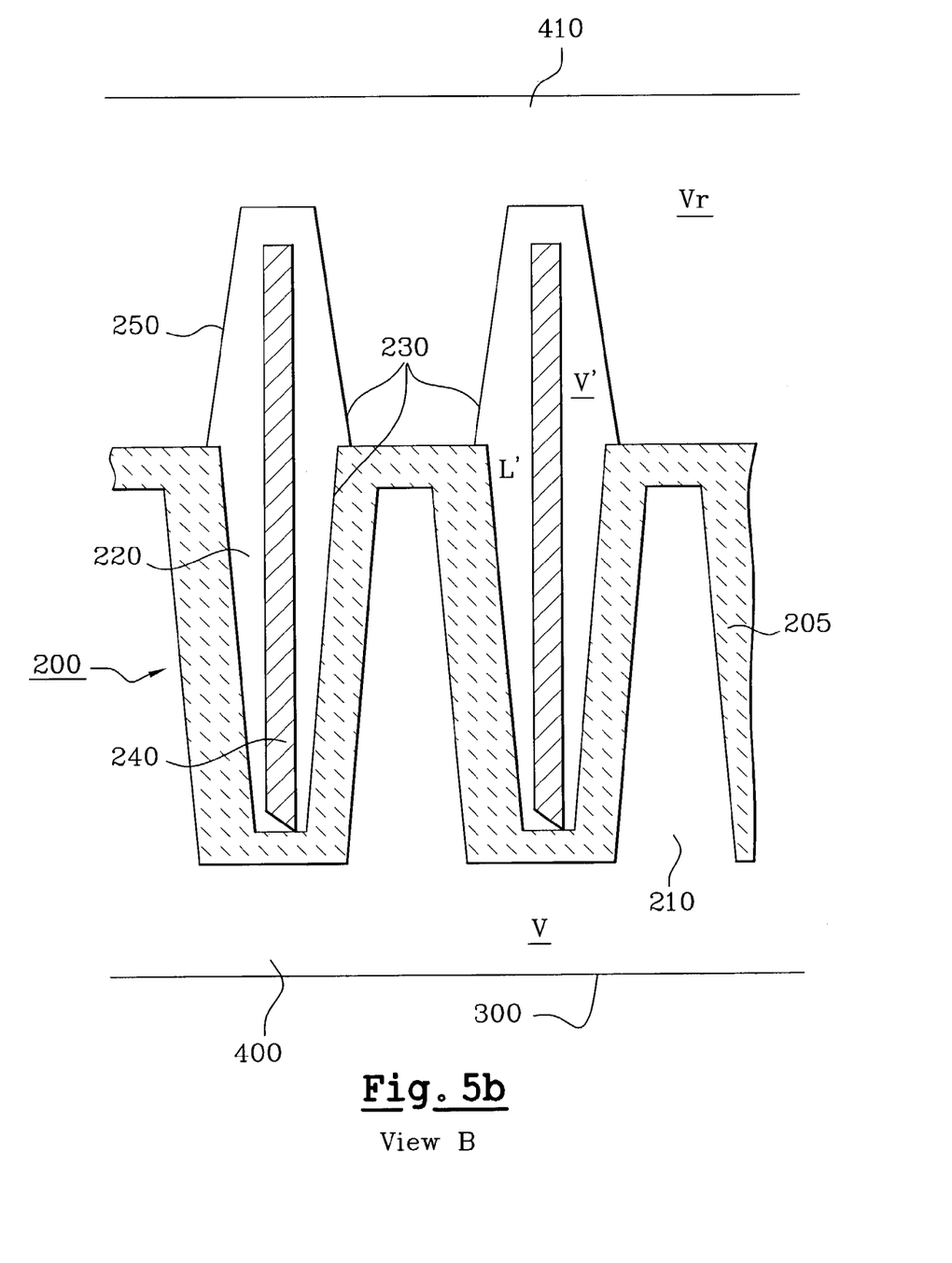

The detailed view B of FIG. 5b enables a better description of the particular features of the device according to the invention in its application to cyclical use.

The heat-exchange cavities 220 contain a heat-carrying fluid L' consisting of a liquid-gas phase changing material such as water or alcohol and a supply tube 240 of heat-carrying fluid L'.

According to one particular feature of the invention, these heat-exchange cavities 220 are closed by a dome-shaped lid 250 that provides heat exchange with the fluid Vr of the secondary circuit 410 flowing above this surface 250. The second zone 225 of the block 200 therefore encompasses the heat-exchange cavities 220 and their dome 250 in the sealed sheathing 230.

The difference in temperature between the heat-carrying fluid L' at the bottom of the heat-exchange cavity 220 and the fluid Vr of the secondary circuit 410 is very low (some degrees).

During the adsorption phase, the heat transmitted to the heat-exchange cavities 220, released by the adsorbent 205, causes the heat-carrying fluid L' to evaporate from the bottom of the cavity 220 to the dome 250 in the form of hot vapors V' under pressure which push out the heat-carrying fluid L' present in the dome 250 towards the bottom of the supply tube 240. These hot vapors V' are then condensed in the dome 250 in contact with the fluid Vr, which is colder, of the secondary circuit 410.

Conversely, during the regeneration phase, the fluid Vr of the secondary circuit 410 is hotter (by joint action of the heater and of the reversible pump 8) and prompts a heating of the dome 250 leading to the evaporation of the heat-carrying liquid L' which gets condensed in the cavity 220, thus yielding heat to the adsorbents 205 to be regenerated. The condensed fluid L' comes out of the cavity 220 through the supply tube 240 to the dome 250.

According to advantageous special characteristic of the implementation of the invention, the boiling temperature of the heat-carrying fluid L' is different in the two distinct phases of adsorption and regeneration, this difference in boiling temperature being regulated by the difference in pressure of the fluid Vr flowing in the secondary circuit 410 in contact with the dome 250 which is flexible and transmits the pressure.

One method of making the adsorbent block 200 according to the invention shall now be specified.

Preferably, the shaping of the adsorbent block 200 with its cavities 210, 220 can be achieved by molding, injection or pressing in a mold of a paste consisting of adsorbent powder mixed with water and a binder.

The shaping of the adsorbent block 200 may also be obtained by continuous extrusion through a die followed by a cutting operation, for example by means of a wire. In case the sheathing 230 consists of at least one metal tube with ribs 235, the block 200 can advantageously be achieved by continuous co-extrusion of the metal tube with ribs and of the adsorbent.

The block 200 is dried, at 100° C. in dry air for example, and then totally dehydrated by firing at 450° C. in a vacuum of 0.1 Pa for example. The periphery of the block 200 is then impregnated with resin to constitute a heat insulation 350 and the block 200 is placed in an adsorption chamber 300 and vacuum-sealed.

The shaping of the block 200 by molding makes it possible to obtain a direct sealed separation 230 between the two zones 215 and 225, by making cavities 210 and 220 that respectively open out on only one face of the block 200. For example, the adsorbent paste 205 can be pressed directly on to metal tubes or a sealed plastic film 230 can be positioned on one of the faces of the mold. The conical shape of the cavities 210, 220 can be used essentially to facilitate the demolding.

In the case of a shaping of the block 200 by extrusion, the cavities 210, 220 are open on both sides of the block 200. Pierced metal grids may be bonded on either side of the block 200 in order to close one in every two openings of cavities on each face, and a sealing film 230 may be deposited, by spraying for example, on the cavities 220 designed for the heat exchange.

What is claimed is:

1. An adsorption refrigeration device comprising an evaporator chamber containing a refrigerant liquid with its vapor that evaporates under the effect of a depression, a connecting device and an adsorption chamber under vacuum containing an adsorbent capable of fixing the vapors of the refrigerant liquid, wherein the adsorbent comprises one or more rigid blocks comprising a plurality of cavities, at least one part of said cavities being feeder cavities capable of diffusing vapors of refrigerant liquid on the adsorbent.

2. A refrigeration device according to claim 1, wherein at least one other cavity is a heat-exchange cavity capable of discharging the heat released during the adsorption of the vapors of the refrigerant liquid.

3. A refrigeration device according to claim 2, wherein the block has two zones separated by a thermally conductive vacuum-tight sheathing, the first zone comprising the adsorbent and the feeder cavities and opening on one face of the block in the adsorption chamber, and the second zone comprising the at least one heat-exchange cavity and opening on the opposite face of the block on the outside of the adsorption chamber.

4. A refrigeration device according to claim 3, wherein the sheathing comprises at least one metal tube that sheathes the at least one heat-exchange cavity.

5. A refrigeration device according to claim 3, wherein the first zone comprises metallic ribs thermally bonded to the sheathing.

6. A refrigeration device according to claim 5, wherein the ribs are in aluminum.

7. A refrigeration device according to claim 3, wherein the sheathing comprises a plastic film resting on the walls of the second zone of the block and bonded to the adsorption chamber.

8. A refrigeration device according to claim 3, wherein the second zone of the adsorbent block comprises a vapor diffusion device.

9. A refrigeration device according to claim 8, wherein the vapor diffusion device consists of a hydrophobic porous material.

10. A refrigeration device according to claim 3, wherein the second zone of the block comprises a lid with at least one aperture to the outside atmosphere that limits the flow rate of a vapor of a phase changing material.

11. A refrigeration device according to claim 10, wherein the vapor of the phase changing material undergoes adiabatic expansion through said at least one aperture so as to lower the temperature when it escapes outwards.

12. A refrigeration device according to claim 11, wherein the lowering of the temperature of the vapor is greater than or equal to 35° C.

13. A refrigeration device according to claim 2, wherein the at least one heat-exchange cavity contains a heat sink constituted by a phase-changing material.

14. A refrigeration device according to claim 13, wherein the phase-changing material passes from the solid state to the liquid state.

15. A refrigeration device according to claim 13, wherein the phase-changing material passes from the liquid state to the gas state.

16. A refrigeration device according to claim 15, wherein the material is water.

17. A refrigeration device according to claim 15, wherein the phase-changing material comprises an aromatic additive.

18. A refrigeration device according to claim 2, with cyclical operation, comprising an adsorption phase and an adsorbent regeneration phase, the at least one heat-exchange cavity capable of heating the adsorbents for their regeneration.

19. A refrigeration device according to claim 18, wherein the at least one heat-exchange cavity contains a heat-carrying fluid comprises of a liquid-gas phase-changing material.

20. A refrigeration device according to claim 19, wherein the boiling temperature of the heat-carrying fluid is different in the two distinct phases of adsorption and regeneration.

21. A refrigeration device according to claim 20, wherein the boiling temperature of the heat-carrying fluid is regulated by the pressure of the fluid flowing in the thermal circuit in contact with the domes.

22. A refrigeration device according to claim 18, wherein the at least one heat-exchange cavity is closed by a dome whose external surface is in contact with a fluid flowing in a thermal circuit.

23. A refrigeration device according to claim 18, wherein the at least one heat-exchange cavity comprises at least one tube for the supply of heat-carrying fluid.

24. A device according to claim 1, wherein the adsorbent is a zeolite.

25. A device according to claim 1, wherein the refrigerant liquid is water and/or an alcohol.

26. A device according to claim 1, wherein the block further comprises thermal insulation on its periphery.

27. A device according to claim 26, wherein the thermal insulation comprises a mixture of adsorbent and resin.

28. A device according to claim 1, for single use.

29. A method of shaping an adsorbent block for use in a refrigeration device, wherein the method comprises:
mixing an adsorbent material with a binder to obtain a paste;
shaping the paste to a block with cavities shaped within the block; and
drying the shaped block.

30. The method according to claim 29, wherein shaping the paste comprises an injection molding step in a mold provided with the cavities' shapes.

31. The method according to claim 29, wherein shaping the paste comprises an extrusion step through a die provided with the cavities' shapes and a cutting step.

32. The method according to claim 29, wherein the method further comprises creating a thermally conductive vacuum-tight sheathing in the shaped block.

33. A method for manufacturing an adsorption refrigeration device comprising an evaporator chamber containing a refrigerant liquid with its vapor that evaporates under the effect of a depression, a connecting device and an adsorption chamber under vacuum containing an adsorbent capable of fixing the vapors of the refrigerant liquid, wherein the adsorbent comprises one or more rigid blocks comprising a plurality of cavities, at least one part of said cavities being feeder cavities capable of diffusing vapors of refrigerant liquid on the adsorbent, wherein the method further comprises:

shaping at least one adsorbent block, wherein shaping an adsorbent block comprises:

mixing an adsorbent material with a binder to obtain a paste;

shaping the paste to a block with cavities shaped in the block; and drying the shaped block;

placing the shaped block in the adsorption chamber; and providing the connecting device between the adsorption chamber and the evaporator chamber.

34. The method according to claim 33, wherein at least one cavity of the adsorbent block being a heat-exchange cavity, and the method further comprises filling the heat-exchange cavity with phase changing material.

35. The method according to claim 34, wherein the method further comprises providing a diffusing device on one face of the adsorbent block where the heat-exchange cavity opens.

36. The method according to claim 34, wherein the method further comprises providing a lid on one face of the adsorbent block where the heat-exchange cavity opens, the lid comprising at least one hole adapted to provide for an adiabatic expansion of vapor of the phase changing material.

* * * * *